April 1, 1947.  A. J. SCHUBERT  2,418,369

CONTROL MECHANISM FOR AIRCRAFT

Filed Nov. 6, 1943  3 Sheets—Sheet 1

INVENTOR.
Anthony J. Schubert
BY Lancaster, Allwine & Rommel
ATTORNEYS.

April 1, 1947.　　A. J. SCHUBERT　　2,418,369
CONTROL MECHANISM FOR AIRCRAFT
Filed Nov. 6, 1943　　3 Sheets-Sheet 2

INVENTOR.
Anthony J. Schubert
BY Lancaster, Allwine aw Rommel
ATTORNEYS.

April 1, 1947.  A. J. SCHUBERT  2,418,369
CONTROL MECHANISM FOR AIRCRAFT
Filed Nov. 6, 1943  3 Sheets-Sheet 3
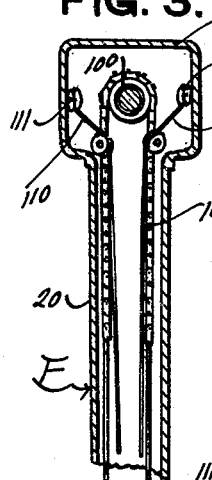
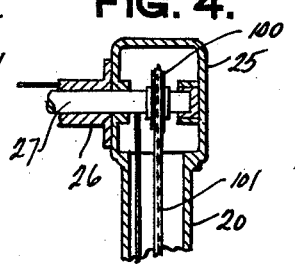
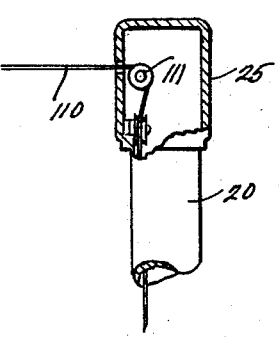
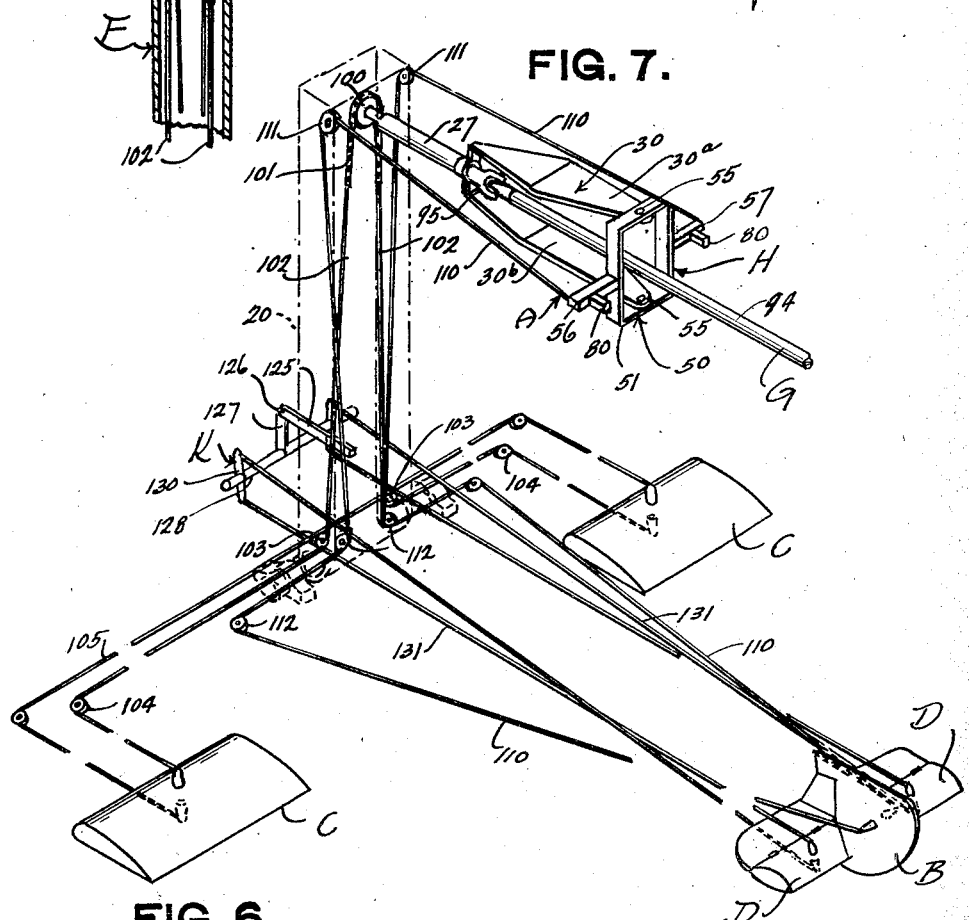
INVENTOR.
Anthony J. Schubert
BY Lancaster, Allwine & Rommel
ATTORNEYS.

Patented Apr. 1, 1947

2,418,369

UNITED STATES PATENT OFFICE 2,418,369

CONTROL MECHANISM FOR AIRCRAFT

Anthony J. Schubert, Raymondville, Tex.

Application November 6, 1943, Serial No. 509,287

3 Claims. (Cl. 244—83)

This invention relates to improvements in control mechanisms for aircraft.

The primary object of this invention is the provision of improved control mechanism for aircraft which is an improvement over conventional control systems and methods in that with the present invention the pilot can control the aeroplane in flight by means of a single hand.

A further object of this invention is the provision of improved manually operated means for controlling the rudder, elevators and ailerons of aircraft without the necessity of the operator using his feet.

Other objects and advantages of the invention will be apparent from the following detailed description.

In the accompanying drawings, forming a part of this specification, and wherein similar reference characters designate corresponding parts thruout the several views, Figure 1 is a fragmentary plan view, partly in section, showing details of the control mechanism.

Figure 3 is a cross sectional view taken thru the upper part of the control column in a plane at right angles to the line of flight.

Figure 4 is a cross sectional view of the upper end of the control column in a plane parallel with the line of flight.

Figure 5 is a sectional view of the upper end of the control column showing certain pulleys for proper training of the control cables.

Figure 6A is a detail view of certain features of the control wheel.

Figure 7A is a detail view, part in section, showing a connecting assembly between the control wheel and the control column.

Figure 1:
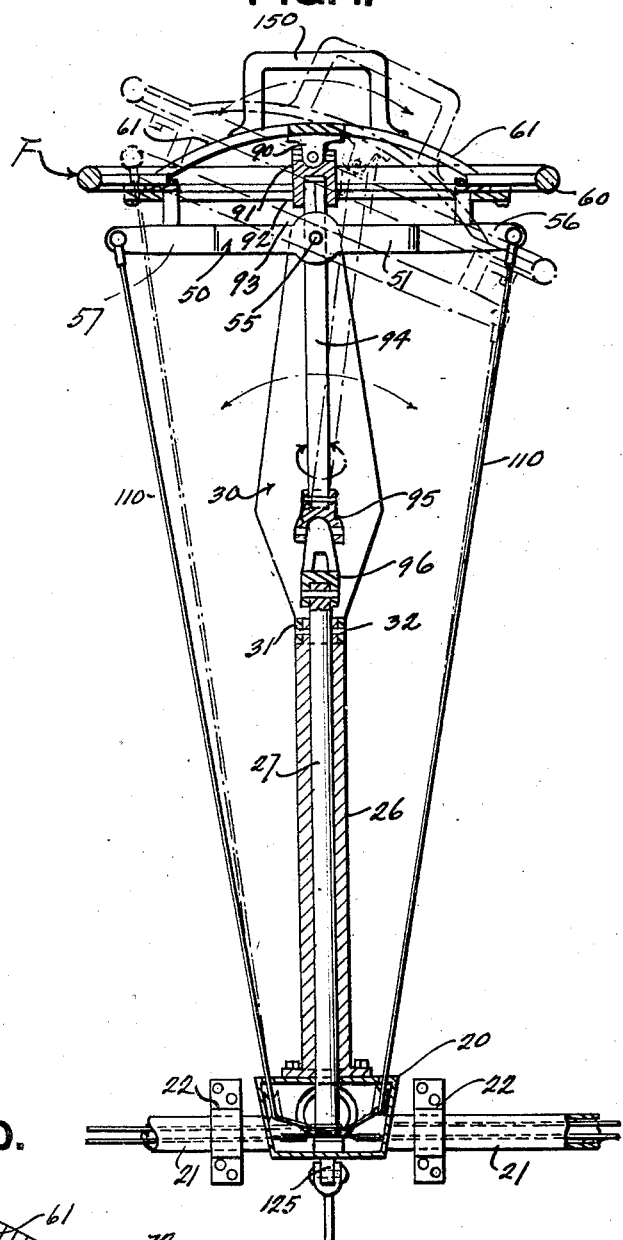

In the drawings, wherein for the purpose of illustration is shown only a preferred embodiment of the invention, the letter A may generally designate the entire control mechanism for control of aircraft rudder B; ailerons C and elevators D.

The control mechanism includes as principal features thereof a control column assemblage E; control wheel F; means G connected with control wheel F for control of the ailerons C; a connecting assemblage H associated directly with the wheel F for control of the rudder B, and means K associated with the control column E for control of the elevators D.

Figure 6:
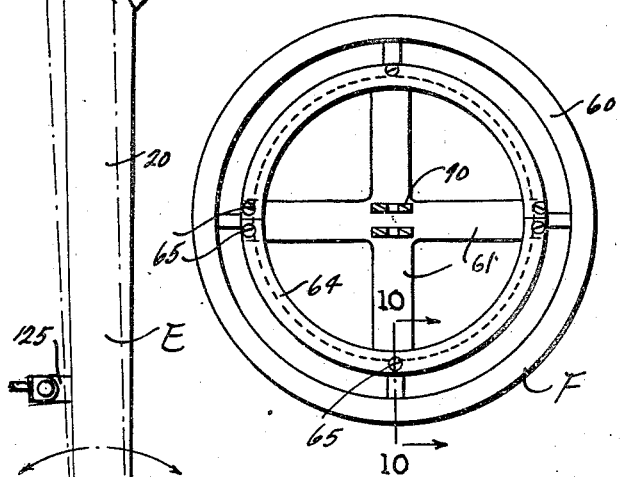
Figure 6 is a cross sectional view taken thru the lower end of the control column showing details and mounting of the latter and pulley training of the control cables.

The control column E preferably comprises a tubular column body 20 having lateral extensions 21 at the lower end thereof and at each side of the axis thereof suitably trunnioned in bearings 22, shown in Figure 6 of the drawings, so that the column body 20 can be moved back and forth on said trunnions in a plane parallel with the line of flight of the axis of the fuselage of the aircraft. At its upper end the control column body 20 is provided with a head 25 providing a suitable bearing sleeve 26 for the support of aileron control shaft 27. The latter extends rearwardly normal to the axis of the control column body 20 thru the bearing sleeve 26, best shown in Figure 1, and at its rear end is connected, as will hereinafter be described, to the steering wheel connecting assemblage H.

Figure 7:
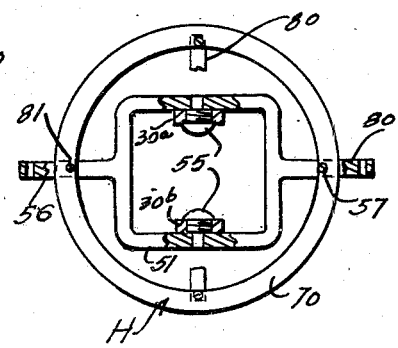
Figure 7 is a diagrammatic representation showing the operating features of the control cables with respect to the control surfaces.
Figure 9:
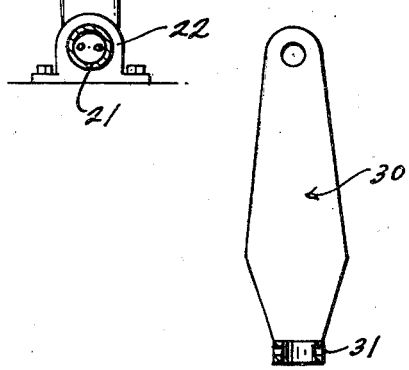
Figure 9 is a longitudinal cross sectional view showing a forked member which is frictionally attached as part of the control column assemblage.
Figure 8:
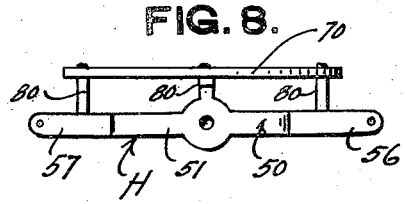
Figure 8 is a plan detail of the connecting assemblage shown in Figure 7A.

The sleeve 26 at its rear end is provided with a rigidly affixed housing fork 30 secured by means of a collar 31 and a pin connection 32; the fork having upper and lower arms 30ª and 30ᵇ respectively, best shown in Figure 7 of the drawings. To the rear ends of these arms 30ª and 30ᵇ is pivotally connected an element of the connecting assemblage H which I prefer to call a cross-bar, designated generally at 50 in Figure 7 of the drawings. This cross-bar 50 is provided with a polygonal-shaped loop portion 51, the upper and lower portions of which pivotally receive the rear ends of the arms 30ª and 30ᵇ as by means of pivot screws or bolts 55, best shown in Figure 7A of the drawings, which provide bearing spindles upon which the loop 51 is pivoted. The side portions of this loop 51 are provided with bar extensions 56 and 57 at opposite sides thereof to which the cable controls for the rudder B are connected, as will be hereinafter described.

Figure 10:
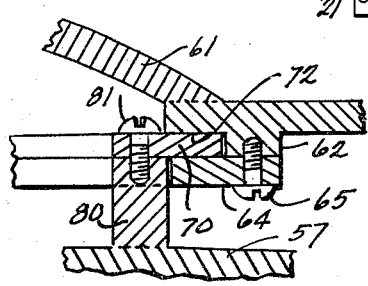
Figure 10 is an enlarged cross sectional view showing the manner in which the control wheel is rotatably associated upon the connecting assemblage of Figures 7A and 8.
Figure 2:
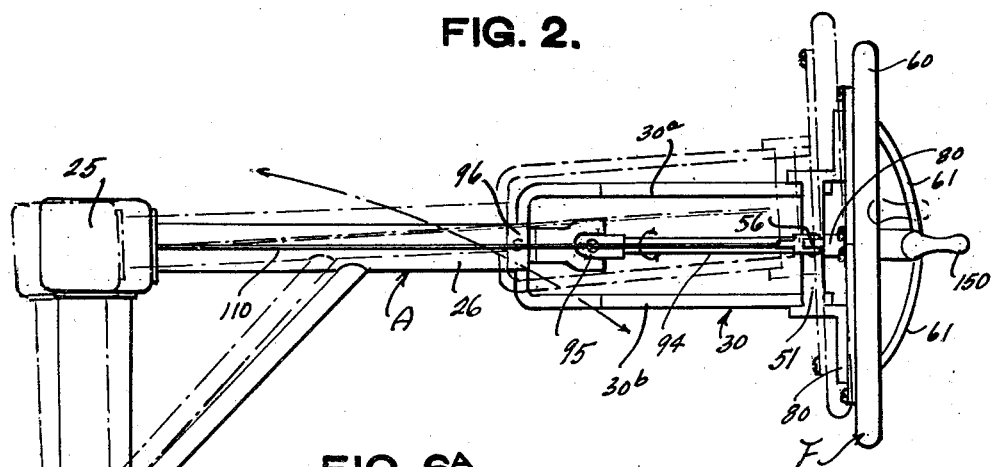
Figure 2 is a side elevation of the control mechanism showing in dot and dash lines a differently adjusted position from the full line position, such as would occur for control of the elevators.

The control wheel F preferably comprises a rim portion 60 provided with a radial arrangement of rearwardly bowed spokes 61, which are rigidly connected to the rim portion and preferably integral therewith. These spokes close to the rim portion 60, but spaced therefrom, are provided with stub extensions 62, best shown in Figure 10 of the drawings, to which on the forward side of the wheel, a retaining ring 64 is detachably secured by screws or bolts 65, best shown in Figure 10. This retaining ring 64 is preferably composed of a plurality of segments to permit of the rotatable connection to the wheel F of a rim or ring-shaped portion 70 which is part of the connecting assemblage H above mentioned. It will be noted from Figure 10 of the drawings that the spokes 61 in association with the segmental ring 64, provide a socket 72 wherein the rim or ring 70 is rotatably mounted.

The assemblage H furthermore includes a crossbar 50 above mentioned. The extensions 56 and 57 above described have rearwardly projecting connecting studs 80 which are detachably connected by means of bolts or screws 81 with the ring 70.

The hub of the wheel F from which the spokes 61 radiate is provided with a bracket portion 90 extending forwardly, to which a universal joint 91 is pivotally connected. The universal joint 91 includes as a novel feature a forwardly extending sleeve portion 92, best shown in Figure 1, having a socket of polygonal cross section wherein a polygonal-shaped end 93 of a shaft portion 94, comprising part of the control shaft assemblage, is socketed, with a splined connection. The shaft portion 94 at its forward end is connected by a universal joint assemblage 95 with a suitable complementary forked portion 96 secured fixedly on the rearward end of the aileron control shaft portion 27 above mentioned.

Referring first to a control of the rudder B, the shaft portion 27 at its forward end has a sprocket wheel 100 over which a chain length 101 is trained. The chain length 101 extends downwardly in the column body 20 for the desired distance and at the ends thereof cable links 102 are connected. These cable links extend downwardly thru the control column body 20 and at their lower ends are suitably trained off of pulleys 103 into the column extensions 21, and furthermore may be trained in any suitable manner over pulley or other arrangements 104 and suitably connected to the ailerons C at each side of the axis of the aircraft. A compensating cable arrangement 105 may be provided to regulate proper movement of the ailerons.

It will be readily understood that upon turning movement of the wheel F, thru the universal joints 91 and 95, and the control shaft portions 27 and 94, the sprocket wheel can be rotated clockwise or counter-clockwise for regulating the ailerons C. For control of the rudder B, it will be noted that the assemblage H, particularly the cross-bar 50 and the rim 70 are connected to the wheel 60 so that lateral movement of the wheel will likewise move these parts laterally. The crossbar extensions 56 and 57 have cable portions 110 trained over suitable pulleys 111 and extended downwardly thru the column body 20 and then suitably trained over pulleys 112 in conventional manner, from whence the said cables 110 extend for connection at opposite sides of the rudder B. Lateral movement of the wheel assemblage F will control the rudder B, as is quite obvious. It should be noted that the wheel F can be rotated notwithstanding lateral movement thereof, because of the provision of the universal joints 91 and 95 in the control shaft assemblage. To compensate for length differential in the control shaft 94 as an incident of lateral movement of the control wheel for controlling the rudder, the splined connection has been provided, altho it need not necessarily be located directly at the control wheel.

It should be noted that the pin axes of the universal joint 91 are back out of line of the axis of the members 55 which fasten the crossbar assemblage to the control housing fork 30. This is done so that as the crossbar assemblage H is hinged on its pins or members 55, all of the universal action caused by throwing the shaft axis of the universal joint 91 out of line with aileron control shaft portions 27 and 94 will not fall on the universal joint 91. Thereby, the action will be divided between both universal joints 91 and 95, as is quite obvious.

Referring to control of the elevators, it can be noted that the control post body 20 is provided above its pivot connection with a forward extension 125 which has a pivot connection at its outer end at 126 with a lever portion 127 of a shaft 128 mounted forwardly of the control post. This shaft 128 is provided with lever extensions 130 having cables 131 leading in the usual manner to the aircraft elevators D. It is quite apparent that forward and rearward movement of the control post body 20 upon its bearing will, thru this assemblage, cause a proper movement of the elevators D. Of course the control post is pivotally moved upon its bearings thru the control wheel F, as will be quite apparent from the drawings and the preceding description.

As an important feature of this invention I have provided a handle 150 looped rearwardly, normally in horizontal position, and connected to the rearwardly bowed horizontal spokes 61. This handle portion is located rearwardly of the rim 60 of the wheel F so that sufficient leverage is provided for lateral and rotative movement of the wheel.

It is quite apparent from the foregoing that every movement employed in the control mechanism is positive and independent of all other movements, and any one movement can be made to the extreme end of its travel in either direction, without interference with corresponding movements for the other controls.

I contemplate the use of the improvements above described in connection with either the Y column or double column type of control.

It is readily apparent that the pilot can control all three movements for control of rudder, elevators and ailerons by means of a single hand. He can, of course, use both hands if desired, but it is unnecessary and the pilot's feet are entirely free.

Various changes in the shape, size and arrangement of parts may be made to the form of invention herein shown and described, without departing from the spirit of the invention or the scope of the following claims.

I claim:

1. In a control assemblage for aircraft the combination of a housing having a pivot connection at its lower end, means connecting the housing above its pivot connection for controlling the elevators of an aircraft thru pivotal movement of said housing, an aileron control shaft assemblage rotatably supported upon the housing and extending rearwardly with respect to the aircraft axis, means dividing said aileron control shaft into forward and rearward sections in a universal joint connection so that the rear section can be moved laterally, means connected with the rear section of said aileron control shaft for operation of the ailerons of an aircraft upon rotative movement of said rear shaft section, means for operation of the rudder of an aircraft, a single control element, and means connecting said single control element with said two last mentioned means, the housing and rear shaft section for independent operative control of said elevators, ailerons and rudder including rocking and rotatable connections between said single control element and said ailerons and carried by said single control element, and a universal joint connection between said element and shaft.

2. In a control assemblage for aircraft the combination of a housing having a pivot connection at its lower end, means connecting the housing above its pivot connection for controlling the elevators of an aircraft thru pivotal movement of said housing, an aileron shaft assemblage rotatably supported upon the housing and extending rearwardly with respect to the aircraft axis, means dividing said aileron control shaft into forward and rearward sections in a pivotal connection so that the rear section can be moved laterally, means connected with the rear section of said aileron control shaft for operation of the ailerons of an aircraft upon rotative movement of said rear control shaft section including a cross bar pivotally connected with said housing, means for operation of the rudder of an aircraft, a single control element, and means connecting said single control element with said last mentioned means, the housing and rear shaft section for independent operative control of said elevators, ailerons and rudder, said single control element comprising a rotatable and laterally movable wheel, having a rotatable connection with said cross bar.

3. In an aircraft surface control assemblage the combination of a housing pivotally supported at its lower end, a rearwardly extending control shaft rotatably mounted upon the housing above the pivot mounting of the housing, a rotatable wheel, mounting means pivotally mounting the wheel with respect to said housing so that it may move laterally with respect to the longitudinal axis of an aircraft, means connected with the mounting means for operating the rudder of an aircraft upon lateral movement of the wheel, and means connecting the wheel with the control shaft including universal joints and a splined connection, said universal joints being disposed with their axes of movement at opposite sides of the pivot of said mounting means.

ANTHONY J. SCHUBERT.

REFERENCES CITED

The following references are of record in the file of this patent:

UNITED STATES PATENTS

| Number | Name | Date |
| --- | --- | --- |
| 1,293,160 | Miller | Feb. 4, 1919 |
| 1,900,068 | Mueller | Mar. 7, 1933 |
| 2,046,570 | Malinowski | July 7, 1936 |
| 2,066,375 | Truman | Jan. 5, 1937 |
| 2,222,204 | Newman et al. | Nov. 19, 1940 |
| 2,339,955 | Shetler | Jan. 25, 1944 |